(12) United States Patent
Luo

(10) Patent No.: US 9,910,445 B2
(45) Date of Patent: Mar. 6, 2018

(54) ADAPTIVE FILTERING SYSTEM FOR AERODYNAMIC ANGLES OF AN AIRCRAFT

(71) Applicant: The Boeing Company, Chicago, IL (US)

(72) Inventor: Jia Luo, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/157,762

(22) Filed: May 18, 2016

(65) Prior Publication Data

US 2017/0336808 A1 Nov. 23, 2017

(51) Int. Cl.
*G05D 1/08* (2006.01)
*B64D 43/02* (2006.01)
*B64C 39/02* (2006.01)

(52) U.S. Cl.
CPC ......... *G05D 1/0825* (2013.01); *B64C 39/024* (2013.01); *B64D 43/02* (2013.01)

(58) Field of Classification Search
CPC ..... B64C 39/024; B64D 43/02; G05D 1/0825
See application file for complete search history.

(56) References Cited

U.S. PATENT DOCUMENTS

| | | | |
|---|---|---|---|
| 5,170,969 A * | 12/1992 | Lin | G05D 1/0808 244/175 |
| 6,273,370 B1 | 8/2001 | Colgren | |
| 6,928,341 B2 | 8/2005 | Wise | |
| 2003/0060939 A1* | 3/2003 | Jones | G05B 13/04 701/3 |
| 2005/0090947 A1* | 4/2005 | Wise | G01P 13/025 701/6 |

FOREIGN PATENT DOCUMENTS

EP 0742142 A2 11/1996

OTHER PUBLICATIONS

Extended European Search Report, dated Jul. 14, 2017, regarding Application No. EP17170925.6, 9 pages.
Kumar, "Filtering and Fusion based Reconstruction of Angle of Attack", National Conference on Range Technology (NACORT) 2006, Jul. 7, 2010, XP055387918, Web, Accessed Jul. 5, 2017, 2 pages. http://nal-ir.nal.res.in/8505/1/NACORT_2006_-_022.pdf.

* cited by examiner

*Primary Examiner* — Aaron L Troost
(74) *Attorney, Agent, or Firm* — Yee & Associates, P.C.

(57) ABSTRACT

A method and apparatus for processing aerodynamic angles for an aircraft. A first rate of change in an inertial aerodynamic angle is calculated using data received from an inertial measurement system for the aircraft. Further, a second rate of change in an externally measured aerodynamic angle is calculated. Yet further, a filtered aerodynamic angle is generated during a flight of the aircraft using the first rate of change in the inertial aerodynamic angle and the second rate of change in the externally measured aerodynamic angle. Still further, a contribution of the first rate of change in the inertial aerodynamic angle used in generated the filtered aerodynamic angle is changed based on a difference between the first rate of change in the inertial aerodynamic angle and the second rate of change in the externally measured aerodynamic angle, enabling controlling the flight of the aircraft using the filtered aerodynamic angle.

18 Claims, 11 Drawing Sheets

ADAPTIVE FILTERING SYSTEM FOR AERODYNAMIC ANGLES OF AN AIRCRAFT

BACKGROUND INFORMATION

1. Field

The present disclosure relates generally to aircraft and, in particular, to a method and apparatus for operating an aircraft. Still more particularly, the present disclosure relates to a method and apparatus for more accurately identifying aerodynamic angles used to operate the aircraft.

2. Background

In operating an aircraft, a pilot receives information about the state of the aircraft. This information is used to make changes in the flight of the aircraft. For example, one type of information received is an angle of attack. The angle of attack affects the amount of lift that a wing provides the aircraft. For example, as the angle of attack increases, the lift increases up to a maximum lift coefficient. The angle of attack with the maximum lift coefficient is called the stall angle of attack.

If the angle of attack increases too much, the aircraft may stall. The angle at which the aircraft may stall is when the angle of attack is greater than the stall angle of attack. The angle of attack is used to provide information and alerts on the flight deck to improve flight crew awareness of airplane state relative to performance limits.

Therefore, it would be desirable to have a method and apparatus that take into account at least some of the issues discussed above, as well as other possible issues. For example, it would be desirable to have a method and apparatus that overcome a technical problem with identifying aerodynamic angles with a reduced amount of noise as quickly and accurately as desired.

SUMMARY

An embodiment of the present disclosure provides an apparatus comprising an aerodynamic angle detection system. The aerodynamic angle detection system calculates a first rate of change in an inertial aerodynamic angle for an aircraft using data received from an inertial measurement system for the aircraft. Further, the aerodynamic angle detection system calculates a second rate of change in an externally measured aerodynamic angle for the aircraft. Yet further, the aerodynamic angle detection system generates a filtered aerodynamic angle during flight of the aircraft using the first rate of change in the inertial aerodynamic angle and the second rate of change in the externally measured aerodynamic angle. Still further, the aerodynamic angle detection system changes a contribution of the first rate of change in the inertial aerodynamic angle used in generating the filtered aerodynamic angle based on a difference between the first rate of change in the inertial aerodynamic angle and the second rate of change in the externally measured aerodynamic angle, enabling controlling the flight of the aircraft using the filtered aerodynamic angle.

Another embodiment of the present disclosure provides an aerodynamic angle detection system. The aerodynamic angle detection system comprises a first rate of change identifier, a second rate of change identifier, a decay identifier, an adjuster, and a filter. The first rate of change identifier calculates a first rate of change in an inertial aerodynamic angle for an aircraft using data received from an inertial measurement system for the aircraft and a filtered aerodynamic angle. The second rate of change identifier calculates a second rate of change in an externally measured aerodynamic angle for the aircraft. The decay identifier identifies a decay value based on a difference between the first rate of change in the inertial aerodynamic angle and the second rate of change in the externally measured aerodynamic angle, enabling controlling a flight of the aircraft using the filtered aerodynamic angle. The adjuster adjusts a contribution of the first rate of change in the inertial aerodynamic angle to form an adjusted contribution. The filter generates the filtered aerodynamic angle during the flight of the aircraft using the adjusted contribution as adjusted by the adjuster and the externally measured aerodynamic angle, enabling controlling the flight of the aircraft using the filtered aerodynamic angle.

Yet another embodiment of the present disclosure provides a method for processing aerodynamic angles for an aircraft. A first rate of change in an inertial aerodynamic angle is calculated for the aircraft using data received from an inertial measurement system for the aircraft and a filtered aerodynamic angle. Further, a second rate of change in an externally measured aerodynamic angle is calculated for the aircraft. The filtered aerodynamic angle is generated during a flight of the aircraft using the first rate of change in the inertial aerodynamic angle and the second rate of change in the externally measured aerodynamic angle. A contribution of the first rate of change in the inertial aerodynamic angle used in generated the filtered aerodynamic angle is changed based on a difference between the first rate of change in the inertial aerodynamic angle and the second rate of change in the externally measured aerodynamic angle, enabling controlling the flight of the aircraft using the filtered aerodynamic angle.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current filters for aerodynamic angles, such as an angle of attack and a sideslip angle, do not filter noise from transitory turbulence and simultaneously react to sustained wind gusts as quickly and accurately as desired to operate an aircraft.

The illustrative embodiments recognize and take into account that currently used first order lag filters used in aircraft to identify angles of attack and sideslip angles may filter out noise from the transitory turbulence, but have a delayed reaction in indicating changes in these angles when sustained gusts of wind are encountered. A delay or lag may not provide information about these angles as quickly and accurately as desired for an autopilot and flight control system to make needed changes to the flight of the aircraft or for a stall warning system to be triggered as quickly and accurately as desired.

The illustrative embodiments also recognize and take into account that currently used complementary filters may provide a desired response to the transitory turbulence by using an internally sensed angle of attack. However, these types of filters are unable to capture rapid changes, such as those from sustained wind gusts.

Thus, the illustrative embodiments provide a method and apparatus for sending data about aerodynamic angles with a reduction in noise from transitory turbulence and quick and accurate enough reactions to sustained wind gusts. In one illustrative example, a first rate of change in an inertial aerodynamic angle for the aircraft is calculated using data received from an inertial measurement system for the aircraft. A second rate of change in an externally measured aerodynamic angle for the aircraft is calculated. A filtered aerodynamic angle is generated during a flight of the aircraft using the first rate of change in the inertial aerodynamic angle and the second rate of change in the externally measured aerodynamic angle. A contribution of the first rate of change in the inertial aerodynamic angle used in generating the filtered aerodynamic angle is changed based on a difference between the first rate of change in the inertial aerodynamic angle and the second rate of change in the externally measured aerodynamic angle, enabling controlling the flight of the aircraft using the filtered aerodynamic angle.

Figure 1:
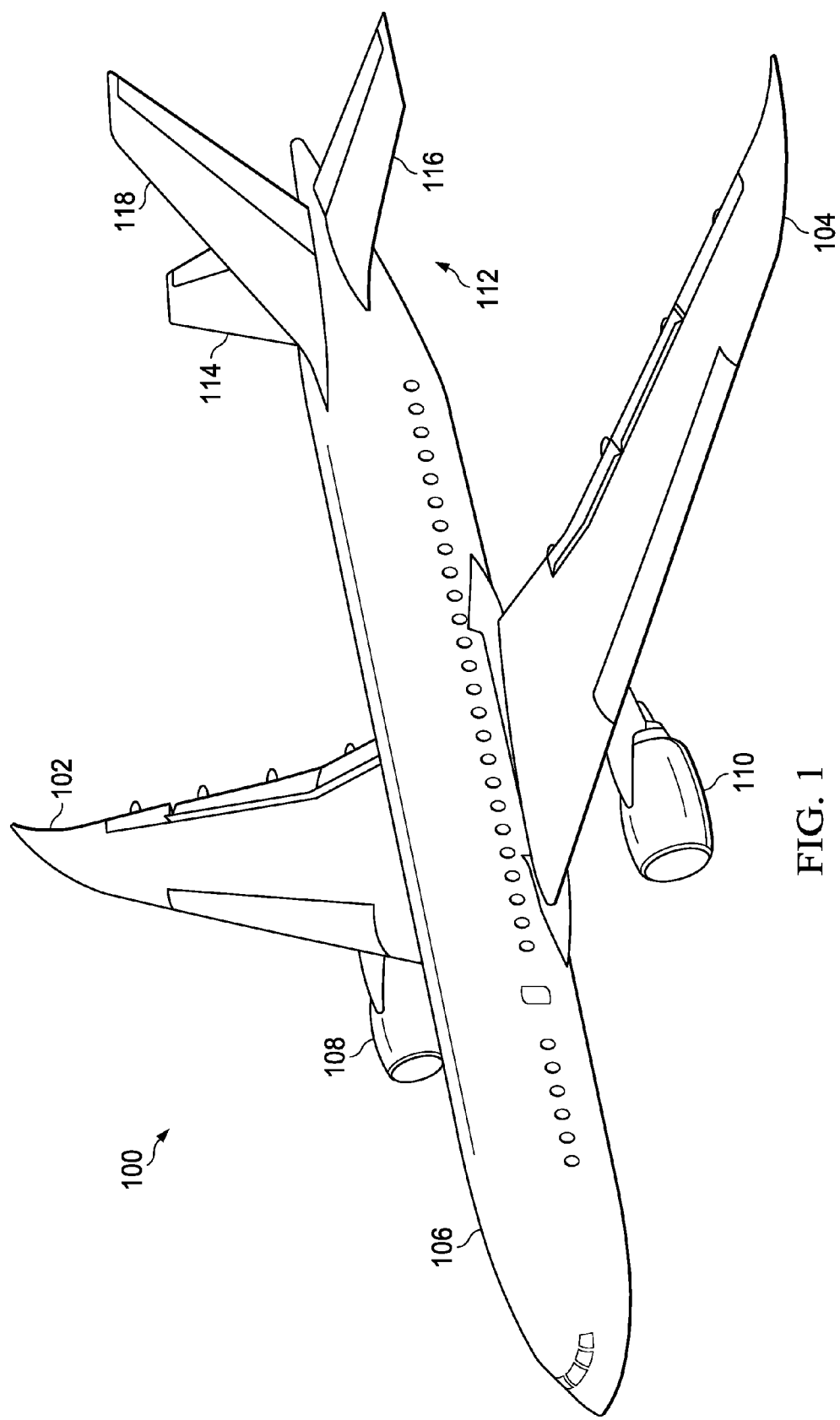
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which an aerodynamic angle detection system may be implemented in accordance with an illustrative embodiment. The aerodynamic angle detection system provides information about aerodynamic angles for use by different data processing systems in aircraft 100 in a manner that reduces noise and lags in identifying the aerodynamic angles. The noise and lags are caused by the manner in which wind changes with respect to an aircraft.

The noise may be caused by transitory turbulence. The lag in identifying an aerodynamic angle may be caused by a sustained wind gust. In this illustrative example, transitory turbulence may occur when a gust of wind around an average wind is encountered by an aircraft. This gust of wind is continuous but varies randomly in time and space. The average wind is calculated by summing wind speed at sampling points within a period of time divided by the number of sampling points.

As depicted, a sustained gust of wind is an average wind with a speed that changes over time. A gust of wind may change suddenly or gradually with time and space due to wind shear and temperature gradients.

Figure 2:
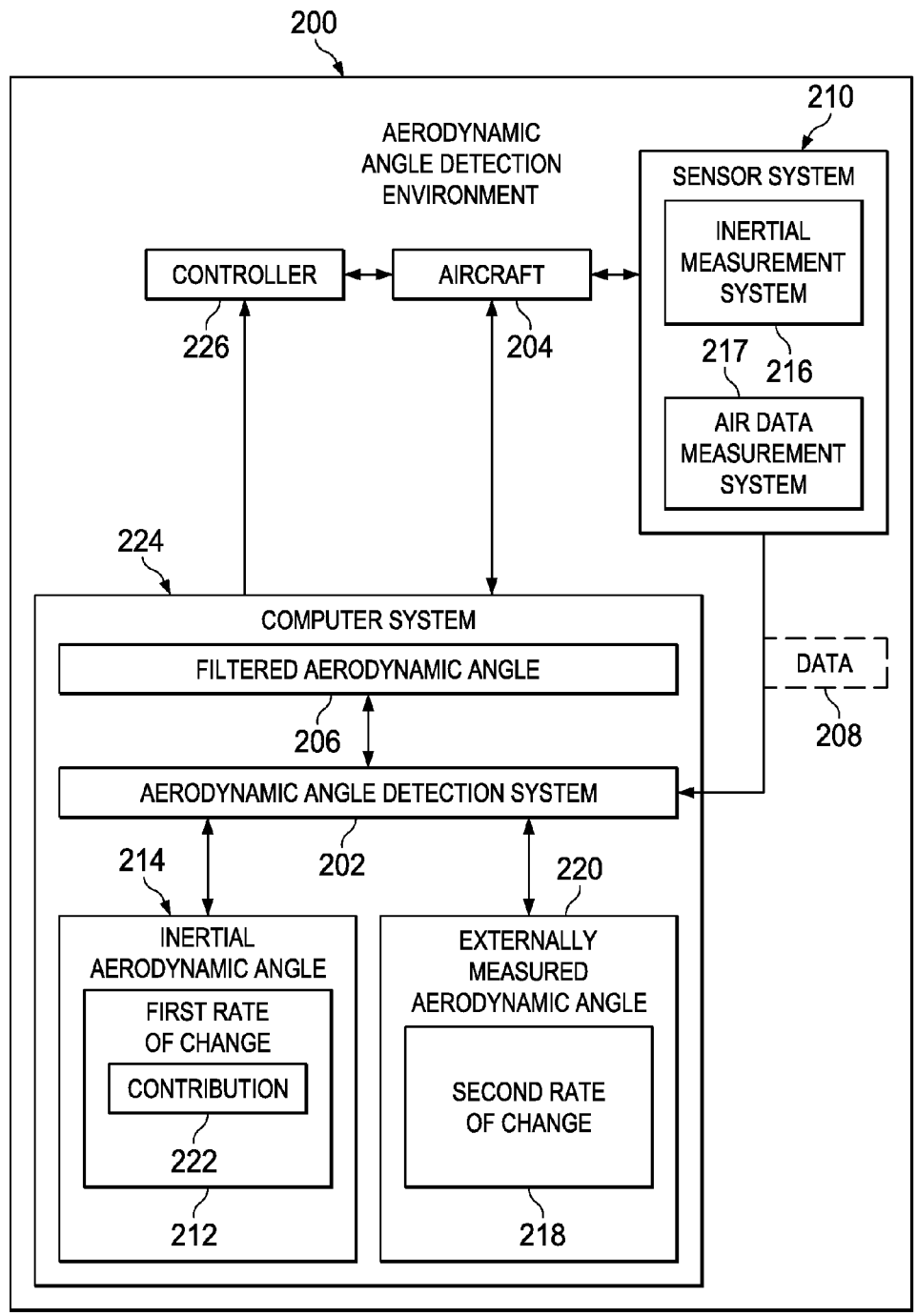
FIG. 2 is an illustration of a block diagram of an aerodynamic angle detection environment in accordance with an illustrative embodiment.

Turning now to FIG. 2, an illustration of a block diagram of an aerodynamic angle detection environment is depicted in accordance with an illustrative embodiment. In this example, aerodynamic angle detection environment 200 includes aerodynamic angle detection system 202 that is associated with aircraft 204.

Aircraft 100 in FIG. 1 is an example of a physical implementation of aircraft 204. Aircraft 204 is selected from one of an airplane, a commercial airplane, a vertical takeoff and landing aircraft, an unmanned aerial vehicle, a rotorcraft, or some other suitable type of aircraft.

In this illustrative example, aerodynamic angle detection system 202 identifies filtered aerodynamic angle 206 for aircraft 204 during flight of aircraft 204. An aerodynamic angle is an angle of airflow relative to aircraft 204. For example, the aerodynamic angle may be selected from one of an angle of attack, a sideslip angle, or some other angle that is the angle of airflow relative to aircraft 204.

Filtered aerodynamic angle 206 is an output generated by aerodynamic angle detection system 202 using data 208 from sensor system 210 in aircraft 204. As depicted, sensor system 210 may make measurements externally to aircraft 204, internal measurements regarding the state of aircraft 204, and the environment around aircraft 204.

As depicted, aerodynamic angle detection system 202 calculates first rate of change 212 in inertial aerodynamic angle 214 for aircraft 204 using data 208 received from inertial measurement system 216 in sensor system 210 for aircraft 204. Aerodynamic angle detection system 202 calculates second rate of change 218 in externally measured aerodynamic angle 220 for aircraft 204 using data 208 received from air data measurement system 217 in sensor system 210.

Aerodynamic angle detection system 202 generates filtered aerodynamic angle 206 during a flight of aircraft 204 using first rate of change 212 in inertial aerodynamic angle 214 and second rate of change 218 in externally measured aerodynamic angle 220. Contribution 222 of first rate of change 212 in inertial aerodynamic angle 214 used in generating filtered aerodynamic angle 206 is changed based on a difference between first rate of change 212 in inertial aerodynamic angle 214 and second rate of change 218 in externally measured aerodynamic angle 220. These operations performed by aerodynamic angle detection system 202 enable controlling the flight of aircraft 204 using filtered aerodynamic angle 206.

Aerodynamic angle detection system 202 calculates first rate of change 212 in inertial aerodynamic angle 214 for aircraft 204 using data 208 received from inertial measurement system 216 for aircraft 204 and changes the contribution of first rate of change 212 in inertial aerodynamic angle 214 to the filtered aerodynamic angle 206.

Filtered aerodynamic angle 206 is used as a feedback to dynamically adjust first rate of change 212 in inertial aerodynamic angle 214. Contribution 222 of first rate of change 212 in inertial aerodynamic angle 214 may be changed to reduce an effect of at least one of a sustained gust of wind, a transitory turbulence, or some other undesired effect.

Aerodynamic angle detection system 202 may be implemented in software, hardware, firmware, or a combination thereof. When software is used, the operations performed by aerodynamic angle detection system 202 may be implemented in program code configured to run on hardware, such as a processor unit. When firmware is used, the operations performed by aerodynamic angle detection system 202 may be implemented in program code and data and stored in persistent memory to run on a processor unit. When hardware is employed, the hardware may include circuits that operate to perform the operations in aerodynamic angle detection system 202.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In this illustrative example, aerodynamic angle detection system 202 may be located in computer system 224 in aircraft 204. Computer system 224 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

As depicted, controller 226 controls the flight of aircraft 204 using filtered aerodynamic angle 206. In one illustrative example, one or more technical solutions are present that overcome a technical problem with identifying aerodynamic angles with a reduced amount of noise as quickly and accurately as desired. As a result, one or more technical solutions may provide a technical effect in which noise is reduced and an identification of an aerodynamic angle is detected more quickly and accurately as compared to currently used filter systems. One or more technical solutions use an inertial aerodynamic angle and an externally measured aerodynamic angle in which contributions of an inertial aerodynamic angle are adjusted.

Figure 3:
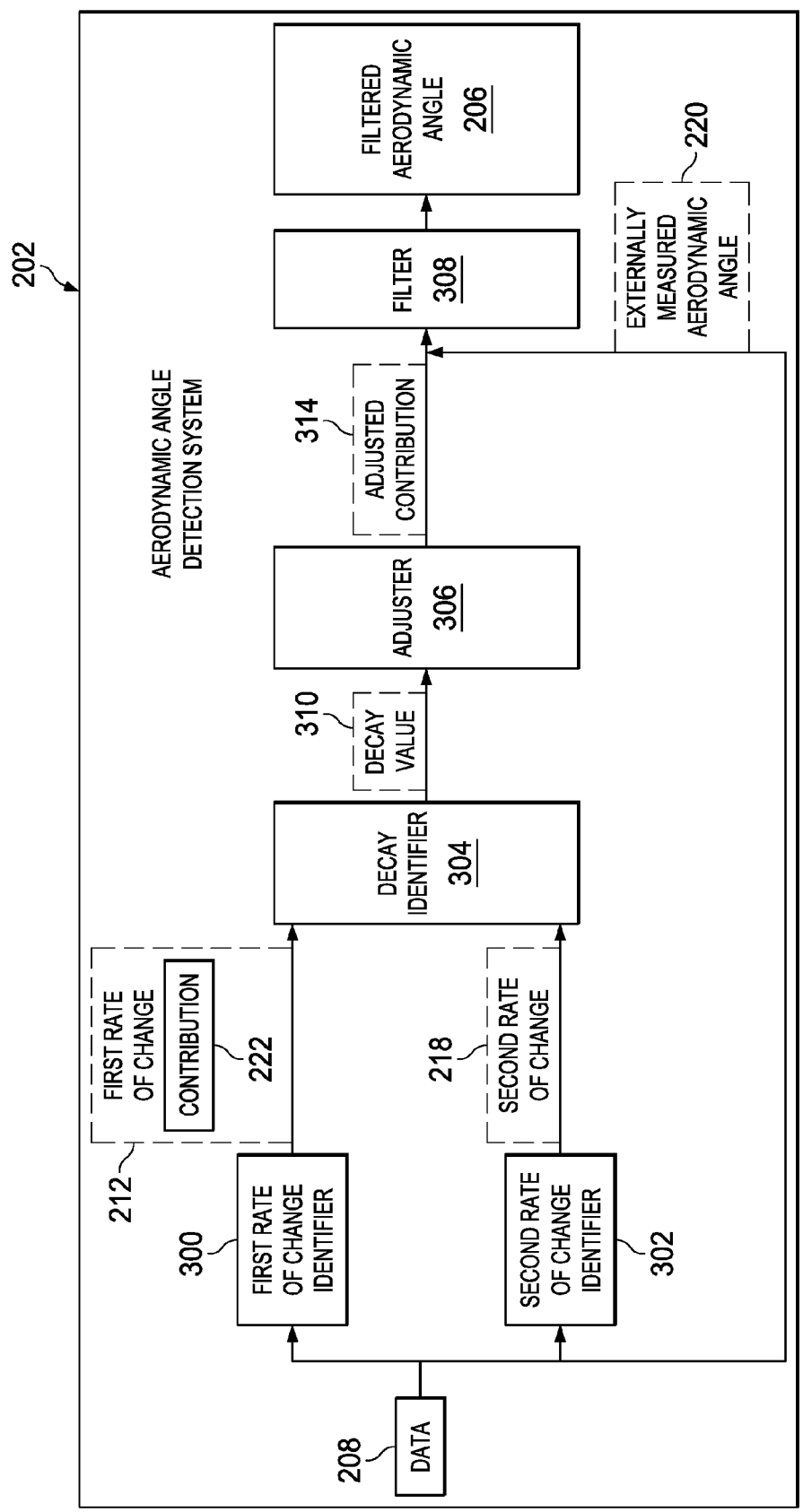
FIG. 3 is an illustration of a block diagram of an aerodynamic angle detection system in accordance with an illustrative embodiment.

With reference now to FIG. 3, an illustration of a block diagram of an aerodynamic angle detection system is depicted in accordance with an illustrative embodiment. In the illustrative examples, the same reference numeral may be used in more than one figure. This reuse of a reference numeral in different figures represents the same element in the different figures.

In the illustrative example, aerodynamic angle detection system 202 includes a number of different functional components. The functional components illustrated in this figure are an example of one manner in which functional components for aerodynamic angle detection system 202 may be implemented. As depicted, aerodynamic angle detection system 202 includes first rate of change identifier 300, second rate of change identifier 302, decay identifier 304, adjuster 306, and filter 308.

First rate of change identifier 300 calculates first rate of change 212 in inertial aerodynamic angle 214 for aircraft 204 in FIG. 2 using data 208 received from inertial measurement system 216 in FIG. 2 for aircraft 204 and filtered aerodynamic angle 206. Second rate of change identifier 302 calculates second rate of change 218 in externally measured aerodynamic angle 220 for aircraft 204.

In this illustrative example, decay identifier 304 identifies decay value 310 based on a difference between first rate of change 212 in inertial aerodynamic angle 214 in FIG. 2 and second rate of change 218 in externally measured aerodynamic angle 220, enabling controlling a flight of aircraft 204 using filtered aerodynamic angle 206.

Adjuster 306 adjusts contribution 222 of first rate of change 212 in inertial aerodynamic angle 214 to form adjusted contribution 314. Filter 308 generates filtered aerodynamic angle 206 during the flight of aircraft 204 using adjusted contribution 314 as adjusted by adjuster 306 and externally measured aerodynamic angle 220, enabling controlling the flight of aircraft 204 using filtered aerodynamic angle 206. In this example, filter 308 comprises a lag filter and, in particular, a first order lag filter.

Figure 4:
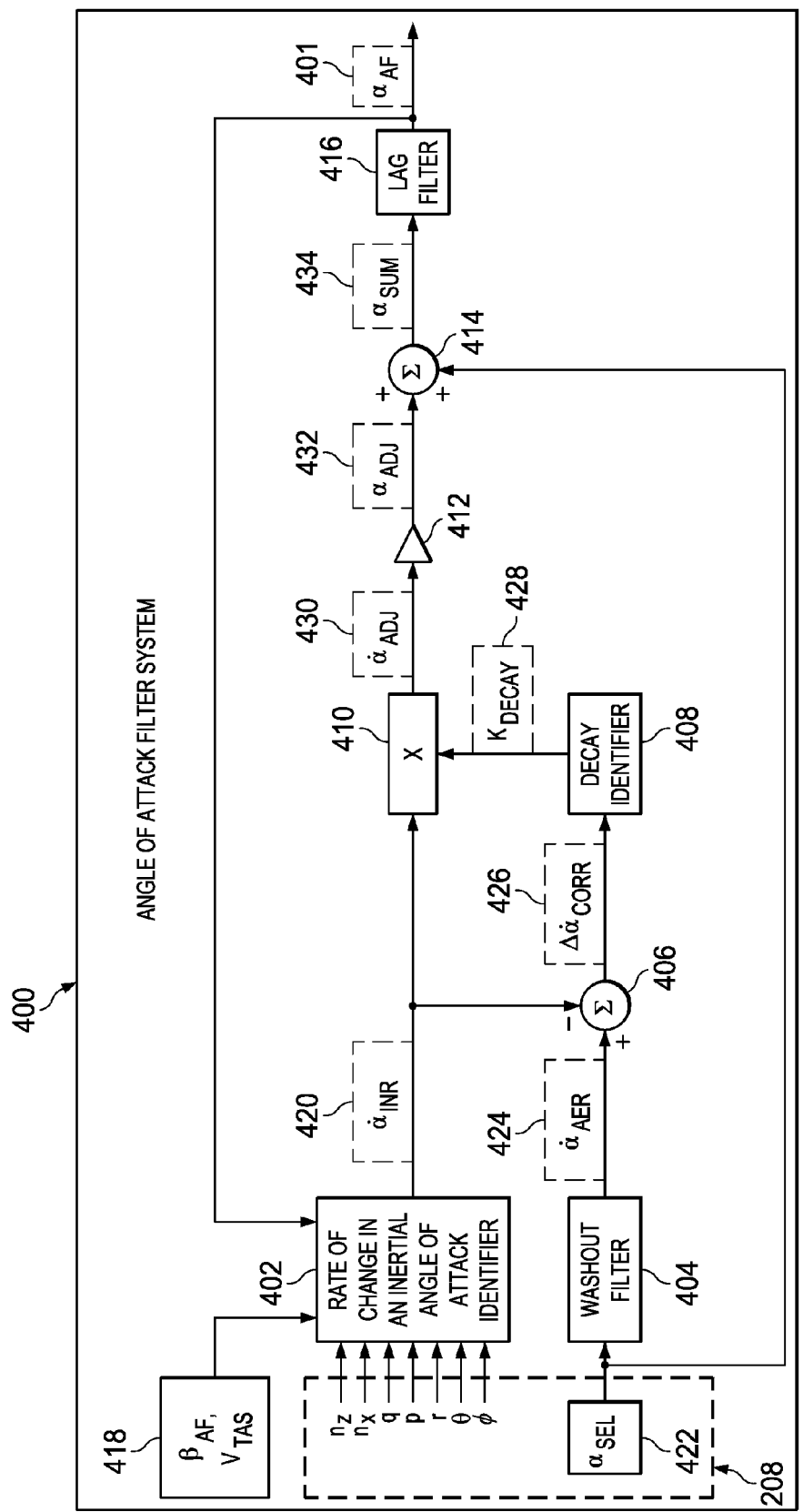
FIG. 4 is an illustration of an angle of attack filter system in accordance with an illustrative embodiment.

Turning to FIG. 4, an illustration of an angle of attack filter system is depicted in accordance with an illustrative embodiment. Angle of attack filter system 400 is a filter system within aerodynamic angle detection system 202 in FIG. 2.

Angle of attack filter system 400 includes a number of different components that are used to output filtered angle of attack ($\alpha_{AF}$) 401. As depicted, angle of attack filter system 400 in aerodynamic angle detection system 202 includes rate of change of inertial angle of attack identifier 402, washout filter 404, subtraction unit 406, decay identifier 408, multiplier 410, converter 412, summing unit 414, and lag filter 416.

Rate of change of inertial angle of attack identifier 402 receives data 208 from inertial measurement system 216 in sensor system 210 in FIG. 2. In this example, data 208 includes $n_z$, $n_x$, q, p, r, θ, and Φ. In this depicted example, $n_z$ and $n_x$ are body axis normal and longitudinal load factors, respectively; q, p, and r are body axis pitch, roll and yaw rates in degrees per second, respectively; θ is a pitch angle in degrees; and Φ is a bank angle in degrees.

Additionally, rate of change of inertial angle of attack identifier 402 receives calculated data 418 for aircraft 204 in FIG. 2 in the form of $\beta_{AF}$ and $V_{TAS}$. In this illustrative example, $\beta_{AF}$ is a filtered sideslip angle, and $\alpha_{AF}$ is filtered angle of attack ($\alpha_{AF}$) 401 output by this implementation of aerodynamic angle detection system 202. As depicted, $V_{TAS}$ is a true airspeed. These pieces of data are calculated from data 208 or other data rather than being generated by sensors in sensor system 210 in FIG. 2.

With these inputs, rate of change of inertial angle of attack identifier 402 calculates inertial angle of attack rate of change ($\dot{\alpha}_{INR}$) 420, which is a rate of change for an inertial angle of attack. The value output by rate of change of inertial angle of attack identifier 402 is an example of first rate of change 212 for inertial aerodynamic angle 214 in FIG. 2. As depicted, washout filter 404 is a filter that smoothes and captures the rate of change of the externally measured angle of attack. In this example, washout filter 404 implements the following equation:

$$\frac{s}{T_{W_\alpha} s + 1}$$

where s is a complex number frequency parameter of Laplace Transform of the filter, whose input is the externally measured angle of attack ($\alpha_{SEL}$) 422 and $T_{W_\alpha}$ is a time constant. $T_{W_\alpha}$ is selected to effectively remove high frequency noise that does not reflect the airplane motion relative to still or moving air mass.

In this example, washout filter 404 receives externally measured angle of attack ($\alpha_{SEL}$) 422 in data 208. Externally measured angle of attack ($\alpha_{SEL}$) 422 is the angle of attack that is measured from air data measurement system 217 of sensor system 210 outside of aircraft 204 in FIG. 2. For example, externally measured angle of attack ($\alpha_{SEL}$) 422 may be measured using a sensor, such as an alpha vane, an angle of attack vane, or a Lidar system, in air data measurement system 217 of sensor system 210 in FIG. 2. These types of sensors make measurements externally to aircraft based on the airflow around the aircraft to identify the angle of attack.

As depicted, washout filter 404 outputs externally measured angle of attack rate of change ($\dot{\alpha}_{AER}$) 424. In this example, externally measured angle of attack rate of change ($\dot{\alpha}_{AER}$) 424 is a rate of change for externally measured angle of attack ($\alpha_{SEL}$) 422.

Subtraction unit 406 has its inputs connected to the outputs from rate of change of inertial angle of attack identifier 402 and washout filter 404. As depicted, subtraction unit 406 receives inertial angle of attack rate of change ($\dot{\alpha}_{INR}$) 420 and externally measured angle of attack rate of change ($\dot{\alpha}_{AER}$) 424 and subtracts inertial angle of attack rate of change ($\dot{\alpha}_{INR}$) 420 from externally measured angle of attack rate of change ($\dot{\alpha}_{AER}$) 424. Subtraction unit 406 outputs difference ($\Delta\dot{\alpha}_{CORR}$) 426.

Decay identifier 408 has its input connected to the output of subtraction unit 406. Decay identifier 408 outputs decay value ($K_{Decay}$) 428 using difference ($\Delta\dot{\alpha}_{CORR}$) 426. In this illustrative example, decay identifier 408 is implemented using the following equation:

$$K_{Decay} = e^{-|F_{Decay} \Delta\dot{\alpha}_{CORR}|}$$

where $F_{Decay}$ is a constant. $F_{Decay}$ is selected to take into account wind gusts that may last long enough to cause inertial angle of attack rate of change ($\dot{\alpha}_{INR}$) 420 and externally measured angle of attack rate of change ($\dot{\alpha}_{AER}$) 424 to be substantially opposite to each other in value. These types of gusts of wind are sustained gusts of wind. In the illustrative example, decay value ($K_{Decay}$) 428 is used to adjust the contribution of inertial angle of attack rate of change ($\dot{\alpha}_{INR}$) 420 to the angle of attack filter system 400.

The adjustment in the contribution is performed at multiplier 410. Multiplier 410 has its inputs connected to the outputs of rate of change of inertial angle of attack identifier 402 and decay identifier 408. Multiplier 410 multiplies the value of inertial angle of attack rate of change ($\dot{\alpha}_{INR}$) 420 and decay value ($K_{Decay}$) 428. Multiplier 410 outputs adjusted contribution of inertial angle of attack rate of change ($\dot{\alpha}_{ADJ}$) 430.

As depicted, converter 412 has its input connected to multiplier 410. Converter 412 converts the rate into an adjusted angle using a time constant ($T_{c\alpha}$) and outputs adjusted inertial angle of attack ($\alpha_{ADJ}$) 432. The time constant ($T_{c\alpha}$) is selected to effectively remove transitory turbulence contents that may be present in externally measured angle of attack ($\alpha_{SEL}$) 422 by lag filter 416. The function of the time constant ($T_{c\alpha}$) in converter 412 is to provide a lead to offset any lag that lag filter 416 may introduce to externally measured angle of attack ($\alpha_{SEL}$) 422.

In this illustrative example, summing unit 414 has an input connected to the output of converter 412. The other input of summing unit 414 receives externally measured angle of attack ($\alpha_{SEL}$) 422. Summing unit 414 outputs summed angle of attack ($\alpha_{SUM}$) 434.

Lag filter 416 is also called a low pass filter and has its input connected to the output of summing unit 414 to receive summed angle of attack ($\alpha_{SUM}$) 434. Lag filter 416 implements the following equation:

$$\frac{1}{T_{C_\alpha} s + 1}$$

where s is a complex number frequency parameter of Laplace Transform of the filter, whose input is the summed angle of attack ($\alpha_{SUM}$) 434 and $T_{c\alpha}$ is a time constant which is also used in converter 412.

As depicted, lag filter 416 outputs filtered angle of attack ($\alpha_{AF}$) 401. In this illustrative example, filtered angle of attack ($\alpha_{AF}$) 401 is used in a feedback loop as an input into rate of change of inertial angle of attack identifier 402.

Figure 5:
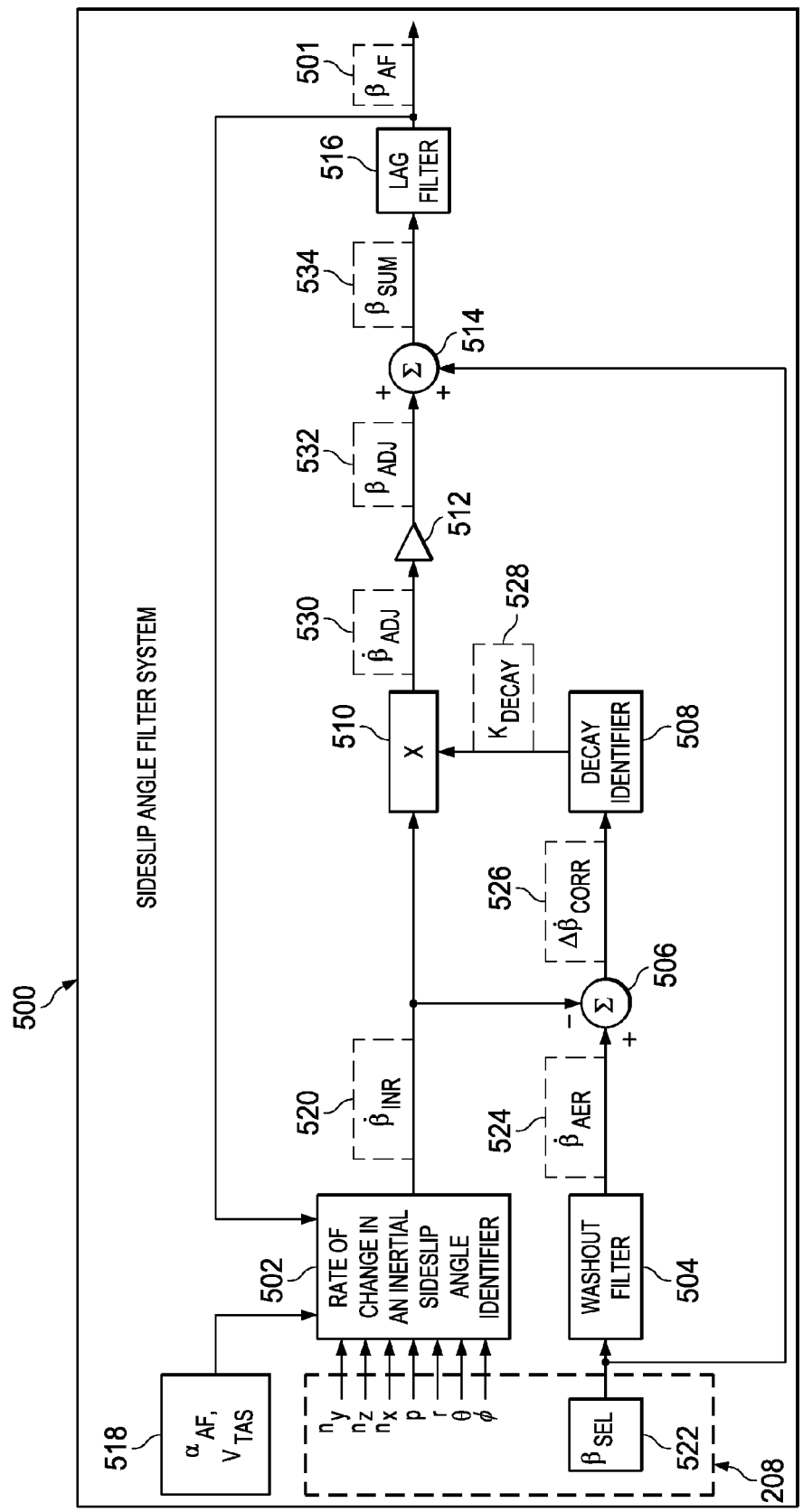
FIG. 5 is an illustration of a sideslip angle filter system in accordance with an illustrative embodiment.

With reference to FIG. 5, an illustration of a sideslip angle filter system is depicted in accordance with an illustrative embodiment. Sideslip angle filter system 500 is a filter system in aerodynamic angle detection system 202 in FIG. 2.

Sideslip angle filter system 500 includes a number of different components that are used to output filtered sideslip angle ($\beta_{AF}$) 501. As depicted, sideslip angle filter system 500 in aerodynamic angle detection system 202 includes rate of change of inertial sideslip angle identifier 502, washout filter 504, subtraction unit 506, decay identifier 508, multiplier 510, converter 512, summing unit 514, and lag filter 516.

Rate of change of inertial sideslip angle identifier 502 receives data 208 from inertial measurement system 216 in sensor system 210 in FIG. 2. In this example, data 208 includes $n_y$, $n_z$, $n_x$, p, r, $\theta$ and $\Phi$. In this example, $n_y$, $n_z$ and $n_x$ are body axis lateral, normal, and longitudinal load factors, respectively; p and r are body axis roll and yaw rate in degrees per second, respectively; $\theta$ is a pitch angle in degrees; and $\Phi$ is a bank angle in degrees.

Additionally, rate of change of inertial sideslip angle identifier 502 receives calculated data 518 for aircraft 204 in FIG. 2 in the form of $\alpha_{AF}$ and $V_{TAS}$. In this illustrative example, $\alpha_{AF}$ is filtered angle of attack filter 401 in aerodynamic angle detection system 202 as illustrated in FIG. 4. $V_{TAS}$ is the true airspeed.

In this example, filtered sideslip angle ($\beta_{AF}$) 501 is a feedback from the output of aerodynamic angle detection system 202 as depicted. Further, filtered sideslip angle ($\beta_{AF}$) 501 is one of the values in calculated data 418 in FIG. 4 that is input into rate of change of inertial angle of attack identifier 402 in FIG. 4.

With these inputs, rate of change of inertial sideslip angle identifier 502 calculates inertial sideslip angle rate of change ($\dot{\beta}_{INR}$) 520, which is a rate of change for the inertial sideslip angle. This value output by rate of change of inertial sideslip angle identifier 502 is an example of first rate of change 212 for inertial aerodynamic angle 214 in FIG. 2.

As depicted, washout filter 504 is a filter that smoothes and captures the rate of change of the externally measured sideslip angle. In this example, washout filter 504 implements the following function:

$$\frac{s}{T_{W_\beta}s+1}$$

where s is a complex number frequency parameter of Laplace Transform of the filter, whose input is the externally measured sideslip angle, and $T_{W_\beta}$ is a time constant. $T_{W_\beta}$ is selected to effectively remove high frequency noise that does not reflect the airplane motion relative to still or moving air mass.

In this example, washout filter 504 receives externally measured sideslip angle ($\beta_{SEL}$) 522 in data 208. Externally measured sideslip angle ($\beta_{SEL}$) 522 is the sideslip angle that is measured from air data measurement system 217 of sensor system 210 outside of aircraft 204 in FIG. 2. Externally measured sideslip angle ($\beta_{SEL}$) 522 may be measured using a sensor, such as a pair of differential pressure beta ports, a beta vane, or a Lidar system in air data measurement system 217 of sensor system 210 in FIG. 2. These types of sensors make measurements externally to aircraft 204 based on the airflow around the aircraft to identify the sideslip angle.

As depicted, washout filter 504 outputs externally measured sideslip angle rate of change ($\dot{\beta}_{AER}$) 524. In this example, externally measured sideslip angle rate of change ($\dot{\beta}_{AER}$) 524 is a rate of change for externally measured sideslip angle ($\beta_{SEL}$) 522.

Subtraction unit 506 has its inputs connected to the output from rate of change of inertial sideslip angle identifier 502 and washout filter 504. In particular, subtraction unit 506 receives inertial sideslip angle rate of change ($\dot{\beta}_{INR}$) 520 and externally measured sideslip angle rate of change ($\dot{\beta}_{AER}$) 524 and subtracts inertial sideslip angle rate of change ($\dot{\beta}_{INR}$) 520 from externally measured sideslip angle rate of change ($\dot{\beta}_{AER}$) 524. Subtraction unit 506 outputs difference ($\Delta\dot{\beta}_{CORR}$) 526.

Decay identifier 508 has its input connected to the outputs of subtraction unit 506. Decay identifier 508 outputs decay value ($K_{Decay}$) 528. In this example, decay identifier 508 implements the following equation:

$$K_{Decay}=e^{-|F_{Decay}\Delta\dot{\alpha}_{CORR}|}$$

where $F_{Decay}$ is a constant. $F_{Decay}$ is selected to take into account wind gusts that may last long enough to cause inertial sideslip angle rate of change ($\dot{\beta}_{INR}$) 520 and externally measured sideslip angle rate of change ($\dot{\beta}_{AER}$) 524 to be substantially opposite to each other in value. These types of gusts of wind are sustained gusts of wind. In the illustrative example, decay value ($K_{Decay}$) 528 is used to adjust the contribution of inertial sideslip angle rate of change ($\dot{\beta}_{INR}$) 520 to sideslip angle filter system 500.

The adjustment in the contribution is performed at multiplier 510. Multiplier 510 has its inputs connected to the outputs of rate of change of inertial sideslip angle identifier 502 and decay identifier 508. Multiplier 510 outputs adjusted contribution of inertial sideslip angle rate of change ($\dot{\beta}_{ADJ}$) 530.

As depicted, converter 512 has its input connected to multiplier 510. Converter 512 converts the rate into an adjusted angle using a time constant ($T_{c\beta}$) and outputs adjusted inertial sideslip angle ($\beta_{ADJ}$) 532. The time constant ($T_{c\beta}$) is selected to effectively remove transitory turbulence contents that may be present in externally measured sideslip angle ($\beta_{SEL}$) 522 by lag filter 516. The function of the time constant ($T_{c\beta}$) in the converter 512 is to provide a lead to offset any lag that lag filter 516 may introduce to externally measured sideslip angle ($\beta_{SEL}$) 522.

In this illustrative example, summing unit 514 has an input connected to the output of converter 512. The other input of summing unit 514 receives externally measured sideslip angle ($\beta_{SEL}$) 522. Summing unit 514 outputs summed sideslip angle ($\beta_{SUM}$) 534.

Lag filter 516 is also called a low pass filter. Lag filter 516 implements the following equation:

$$\frac{1}{T_{C_\beta}s+1}$$

where s is a complex number frequency parameter of Laplace Transform of the filter, whose input is summed sideslip angle ($\beta_{SUM}$) 534, and $T_{C_\beta}$ is a time constant which is also used in converter 512.

As depicted, lag filter 516 outputs filtered sideslip angle ($\beta_{AF}$) 501. In this illustrative example, filtered sideslip angle ($\beta_{AF}$) 501 is used in a feedback loop as an input into rate of change of inertial sideslip angle identifier 502.

Angle of attack filter system 400 in FIG. 4 and sideslip angle filter system 500 are examples of filter systems that may be used in aerodynamic angle detection system 202 in FIG. 2. These two filter systems are examples of adaptive complementary filter systems that reduce noise and provide increased speed in reacting to sustained gusts of wind as compared to currently used filter systems.

Figure 6:
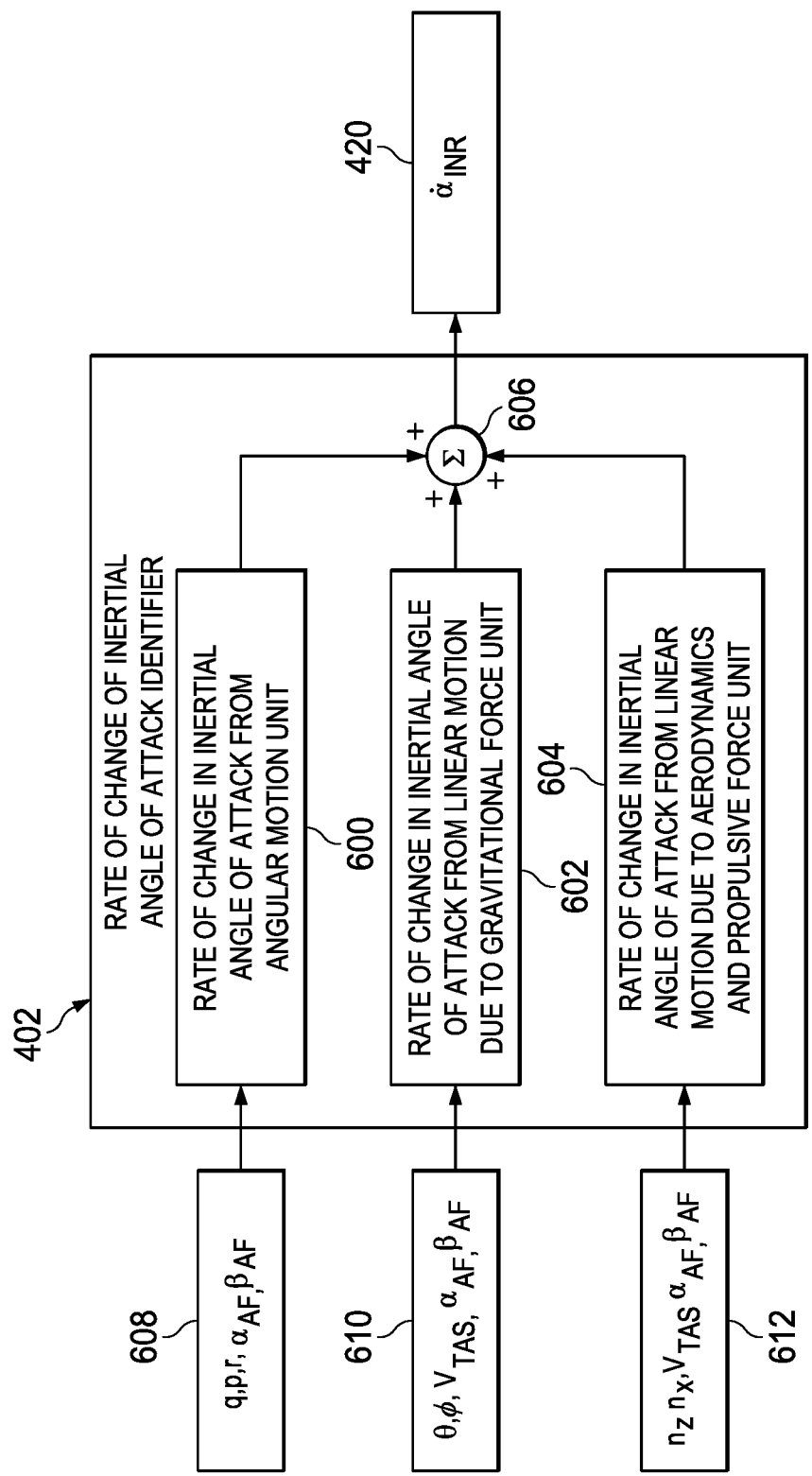
FIG. 6 is an illustration of a rate of change in an inertial angle of attack identifier in accordance with an illustrative embodiment.

With reference next to FIG. 6, an illustration of a rate of change in an inertial angle of attack identifier is depicted in accordance with an illustrative embodiment. In this illustrative example, one implementation for rate of change of inertial angle of attack identifier 402 in FIG. 4 is shown. As depicted, rate of change in an inertial angle of attack identifier 402 includes rate of change in inertial angle of attack from angular motion unit 600, rate of change in inertial angle of attack from linear motion due to gravitational force unit 602, rate of change in inertial angle of attack from linear motion due to aerodynamics and propulsive force unit 604, and summing unit 606. These different components identify different contributions and combine them to calculate inertial angle of attack rate of change ($\dot{\alpha}_{INR}$) 420.

In this illustrative example, rate of change in inertial angle of attack from angular motion unit 600 identifies a component for inertial angle of attack rate of change ($\dot{\alpha}$INR) 420 based on angular motion of aircraft 204 in FIG. 2. These calculations are performed using inputs 608. In this illustrative example, inputs 608 are q, p, r, $\alpha_{AF}$, and $\beta_{AF}$. Inputs 608 are used in the following equation:

$$q - \tan \beta_{AF}(p \cos \alpha_{AF} + r \sin \alpha_{AF}).$$

Rate of change in inertial angle of attack from linear motion due to gravitational force unit 602 identifies another contribution for inertial angle of attack rate of change ($\dot{\alpha}_{INR}$) 420 based on gravitational force. In this example, this contribution is calculated using inputs 610. As depicted, inputs 610 are $\theta$, $\phi$, $V_{TAS}$, $\alpha_{AF}$, and $\beta_{AF}$. Inputs 610 are used in the following equation to calculate rate of change in inertial angle of attack from linear motion due to gravitational force unit 602:

$$\frac{57.3 \, g(\cos\alpha_{AF}\cos\theta\cos\phi + \sin\alpha_{AF}\sin\theta)}{V_{TAS}\cos\beta_{AF}}$$

Next, rate of change in inertial angle of attack from linear motion due to aerodynamics and propulsive force unit 604 calculates a contribution for inertial angle of attack rate of change ($\dot{\alpha}_{INR}$) 420 based on the aerodynamics and propulsive force for aircraft 204 in FIG. 2. The contribution in this unit is calculated using inputs 612, which are $n_Z$, $n_X$, $V_{TAS}$, $\alpha_{AF}$, and $\beta_{AF}$. Inputs 612 are used in the following equation to calculate the contribution:

$$-\frac{57.3 \, g(\cos\alpha_{AF}n_Z + \sin\alpha_{AF}n_X)}{V_{TAS}\cos\beta_{AF}}$$

Summing unit 606 sums the different contributions. The output of summing unit 606 is inertial angle of attack rate of change ($\dot{\alpha}_{INR}$) 420.

Figure 7:
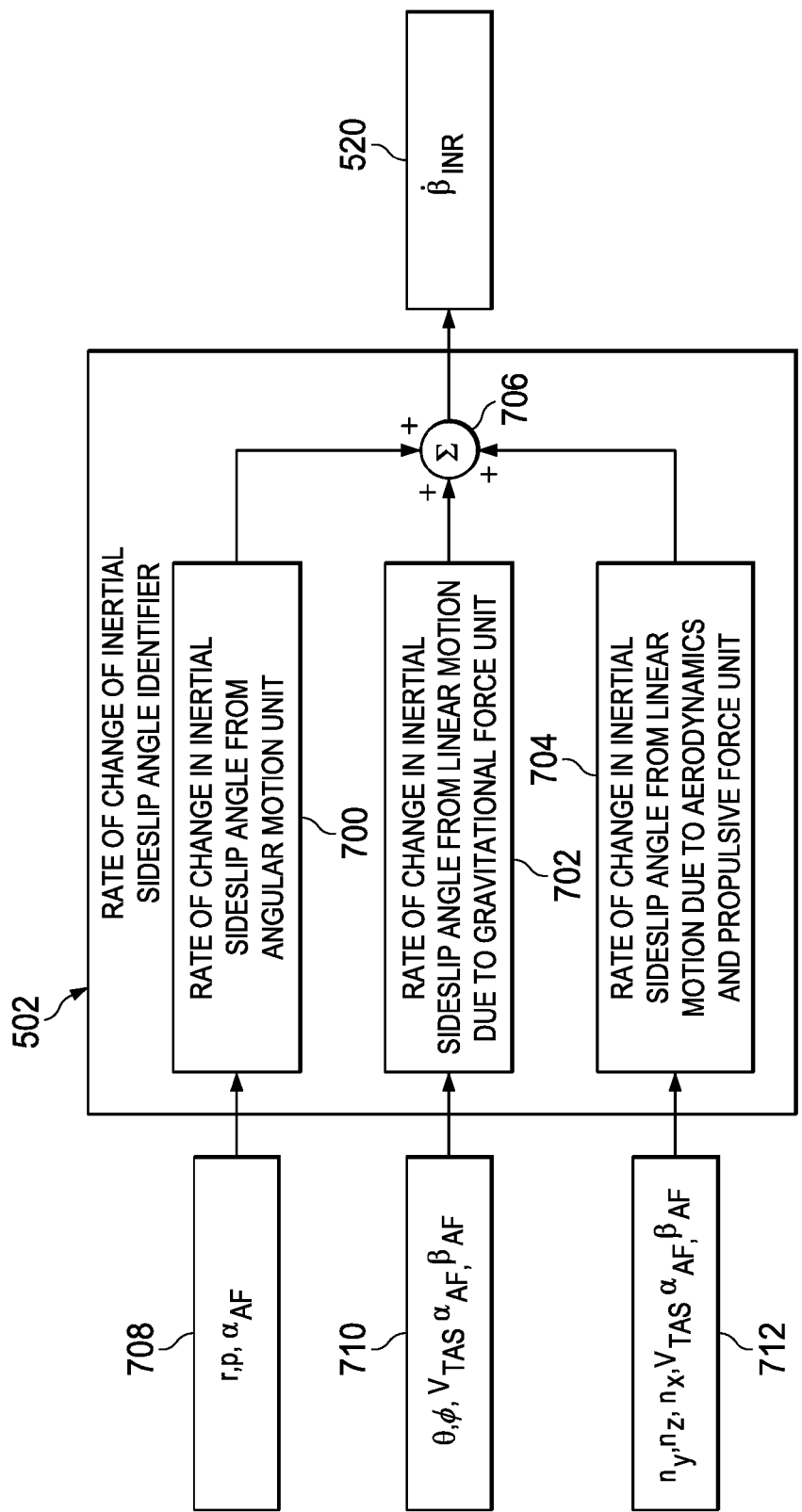
FIG. 7 is an illustration of a rate of change in an inertial sideslip angle identifier in accordance with an illustrative embodiment.

With reference next to FIG. 7, an illustration of a rate of change in an inertial sideslip angle identifier is depicted in accordance with an illustrative embodiment. In this illustrative example, one implementation for rate of change of inertial sideslip angle identifier 502 in FIG. 5 is shown. As depicted, rate of change of inertial sideslip angle identifier 502 includes rate of change in inertial sideslip angle from angular motion unit 700, rate of change in inertial sideslip angle from linear motion due to gravitational force unit 702, rate of change in inertial sideslip angle from linear motion due to aerodynamics and propulsive force unit 704, and summing unit 706. These different components identify different contributions and combine them to calculate inertial sideslip angle rate of change ($\dot{\beta}_{INR}$) 520.

In this illustrative example, rate of change in inertial sideslip angle from angular motion unit 700 identifies a contribution for inertial sideslip rate of change ($\dot{\beta}_{INR}$) 520 based on an angular motion of aircraft 204 in FIG. 2. These calculations are performed using inputs 708. Inputs 708 are r, p, and $\alpha_{AF}$. Inputs 708 are used in the following equation:

$$-r \cos a_{AF} + p \sin a_{AF}.$$

Rate of change in inertial sideslip angle from linear motion due to gravitational force unit 702 identifies another component for inertial sideslip angle rate of change ($\dot{\beta}_{INR}$) 520 based on a linear motion due to gravitational force. In this example, this contribution is calculated using inputs 710. As depicted, inputs 710 are $\theta$, $\phi$, $V_{TAS}$, $\alpha_{AF}$, and $\beta_{AF}$. Inputs 710 are used in the following equation:

$$\frac{57.3(\cos\beta_{AF}\cos\theta\sin\phi + \cos a_{AF}\sin\beta_{AF}\sin\theta - \sin a_{AF}\sin\beta_{AF}\cos\theta\cos\phi)}{V_{TAS}}.$$

Next, rate of change in inertial sideslip angle from linear motion due to aerodynamics and propulsive force unit 704 calculates the component for inertial sideslip angle rate of change ($\dot{\beta}_{INR}$) 520 based on the linear motion due to aerodynamics and propulsive force for aircraft 204 in FIG. 2. The contribution in this unit is calculated using inputs 712, which are $n_Y$, $n_Z$, $n_X$, $V_{TAS}$, $\alpha_{AF}$, and $\beta_{AF}$. Inputs 712 are used in the following equation to calculate the contribution:

$$\frac{57.3(\cos\beta_{AF}n_Y + \sin a_{AF}\sin\beta_{AF}n_Z - \cos a_{AF}\sin\beta_{AF}n_X)}{V_{TAS}}.$$

Summing unit 706 sums the different contributions. The output of summing unit 706 is inertial sideslip angle rate of change ($\dot{\beta}_{INR}$) 520.

The illustration of aerodynamic angle detection environment 200 and the different components in FIGS. 2-7 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, filter 308 in FIG. 3 also may include other components, such as a converter to convert adjusted contribution 314 in FIG. 3 output by adjuster 306 in FIG. 3 from a rate angle for use in generating filtered aerodynamic angle 206 in FIGS. 2-3. In another illustrative example, the different contributions used to calculate inertial angle of attack rate of change ($\dot{\alpha}_{INR}$) 420 in FIG. 6 and inertial sideslip angle rate of change ($\dot{\beta}_{INR}$) 520 in FIG. 7 may vary in different illustrative examples. For example, at least one of angular motion, linear motion due to gravitational force, or linear motion due to aerodynamics and propulsive force may be used in calculating these rates of change.

Figure 8:
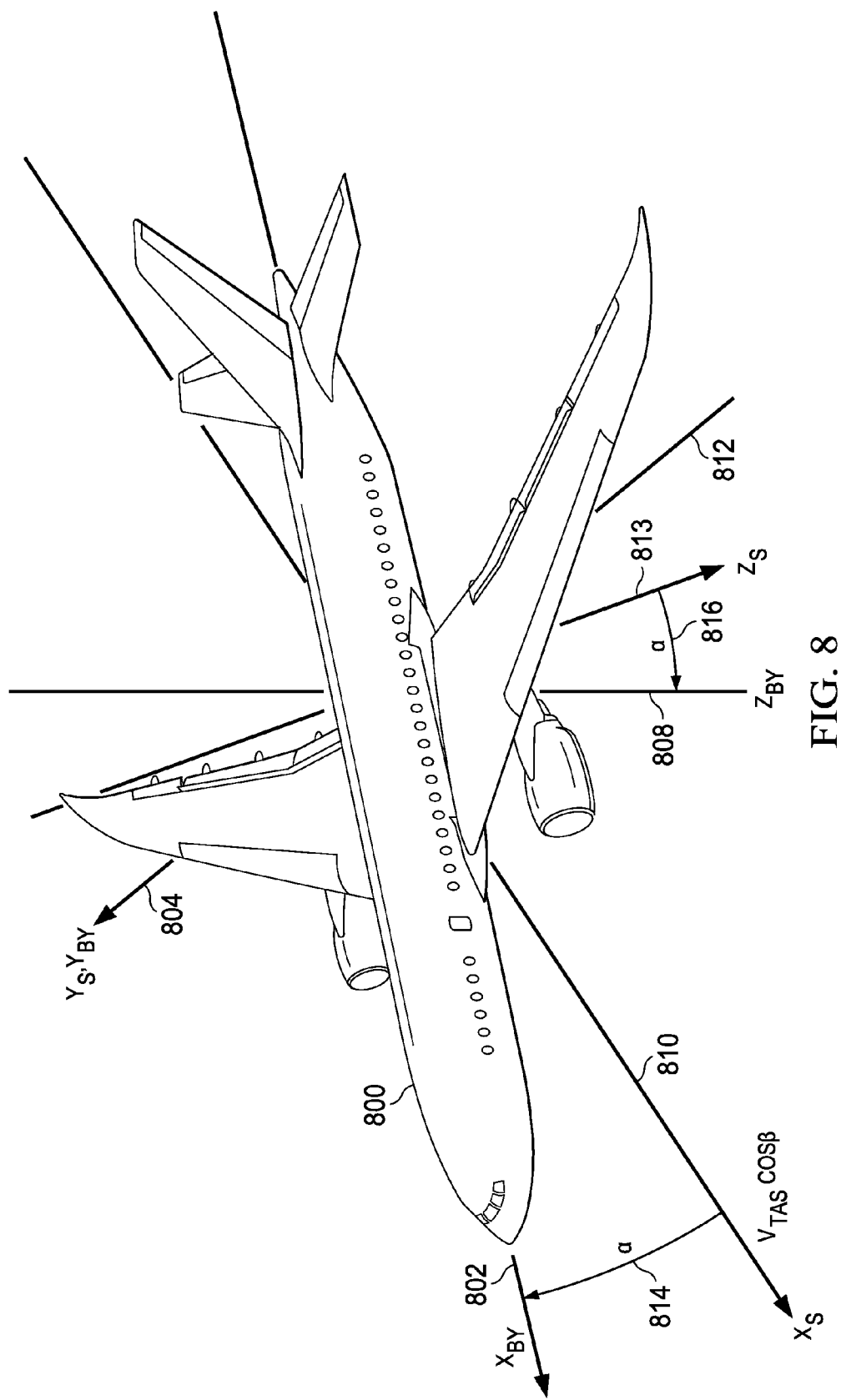
FIG. 8 is an illustration of angles of attack in accordance with an illustrative embodiment.

With reference now to FIG. 8, an illustration of angles of attack is depicted in accordance with an illustrative embodiment. In this illustrative example, aircraft 800 has X body axis 802, Y body axis 804, and Z body axis 808. These body axes are set relative to the frame of aircraft 800. For example, X body axis 802 runs through the fuselage center line of aircraft 800; Z body axis 808 is in the plane of aircraft symmetry for aircraft 800 downwards; and Y body axis 804 is perpendicular to X body axis 802 and Z body axis 808.

Aircraft 800 also has X stability axis 810, Y stability axis 812, and Z stability axis 813. As depicted, Y stability axis 812 coincides with Y body axis 804. Angle of attack ($\alpha$) 814 is the angle between X body axis 802 and X stability axis 810. X stability axis 810 is rotated from X body axis 802 by angle of attack ($\alpha$) 814.

Angle of attack ($\alpha$) 816 is the angle between Z body axis 808 and Z stability axis 813. Z stability axis 813 is rotated from Z body axis 808 by angle of attack ($\alpha$) 816. As depicted, angle of attack ($\alpha$) 816 is substantially the same as angle of attack ($\alpha$) 814.

In the description of implementations for angle of attack filter system 400 in FIG. 4 and sideslip angle filter system 500 in FIG. 5, $n_X$, $n_Y$, and $n_Z$ are body axis load factors along X body axis 802, Y body axis 804, and Z body axis 808, respectively. Also, p, q, and r are body axis angular rate components about X body axis 802, Y body axis 804, and Z body axis 808, respectively.

Figure 9:
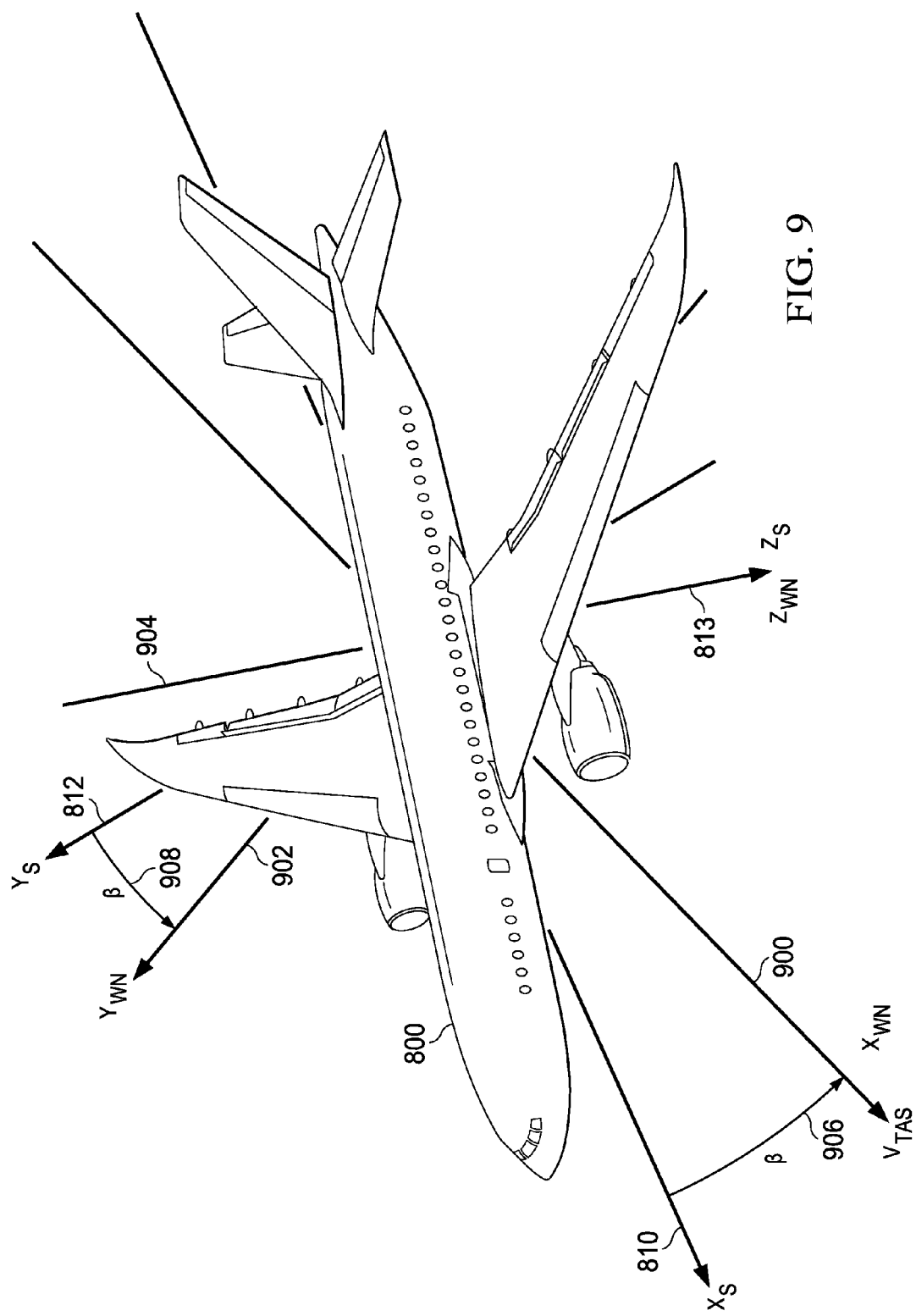
FIG. 9 is an illustration of sideslip angles in accordance with an illustrative embodiment.

Turning to FIG. 9, an illustration of sideslip angles is depicted in accordance with an illustrative embodiment. In this figure, X stability axis 810, Y stability axis 812, and Z stability axis 813 are shown for aircraft 800. Additionally, aircraft 800 has X wind axis 900, Y wind axis 902, and Z wind axis 904.

Sideslip angle (β) 906 and sideslip angle (β) 908 are shown. Sideslip angle (β) 906 is the angle between X stability axis 810 and X wind axis 900. Sideslip angle (β) 908 is the angle between Y stability axis 812 and Y wind axis 902. Sideslip angle (β) 906 is substantially the same as the sideslip angle (β) 908.

As depicted, X wind axis 900 is selected based on the flow of wind relative to aircraft 800. The other two axes are set based on the selection of X wind axis 900 in this illustrative example. In this example, Z wind axis 904 coincides with Z stability axis 813.

Figure 10:
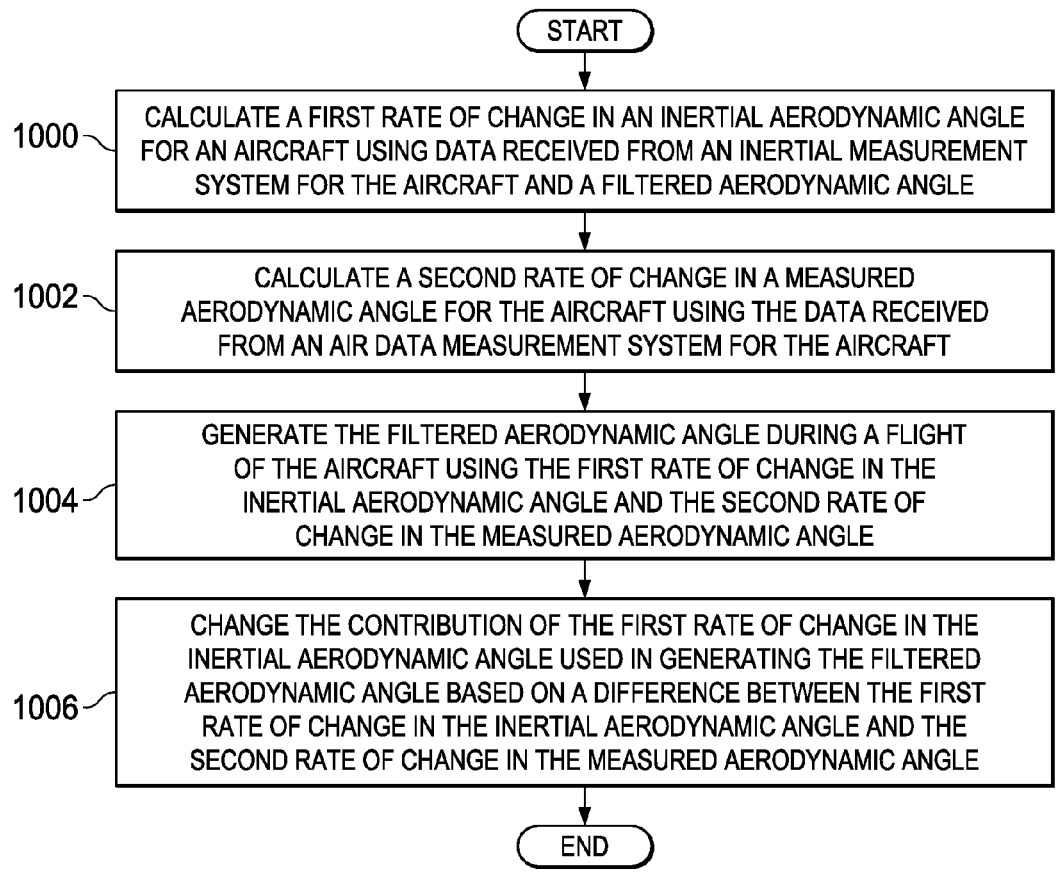
FIG. 10 is an illustration of a flowchart of a process for processing aerodynamic angles for an aircraft in accordance with an illustrative embodiment.

Turning next to FIG. 10, an illustration of a flowchart of a process for processing aerodynamic angles for an aircraft is depicted in accordance with an illustrative embodiment. The process illustrated in FIG. 10 is implemented in aerodynamic angle detection system 202 shown in block form in FIG. 2. This process may be implemented as hardware, software, or some combination thereof.

The process begins by calculating a first rate of change in an inertial aerodynamic angle for an aircraft using data received from an inertial measurement system for the aircraft and a filtered aerodynamic angle (operation 1000). Operation 1000 may be performed by calculating the first rate of change in the inertial aerodynamic angle from at least one of an angular motion, a linear motion from a gravitational force, or a linear motion from aerodynamics and a propulsive force. The process calculates a second rate of change in a measured aerodynamic angle for the aircraft using the data received from an air data measurement system for the aircraft (operation 1002).

The process generates the filtered aerodynamic angle during a flight of the aircraft using the first rate of change in the inertial aerodynamic angle and the second rate of change in the measured aerodynamic angle (operation 1004). The filtered aerodynamic angle is fed back into operation 1000.

The contribution of the first rate of change in the inertial aerodynamic angle used in generating the filtered aerodynamic angle is changed based on a difference between the first rate of change in the inertial aerodynamic angle and the second rate of change in the measured aerodynamic angle (operation 1006) with the process terminating thereafter. The result of this process enables an operation to be performed to control the flight of the aircraft using the filtered aerodynamic angle.

Figure 11:
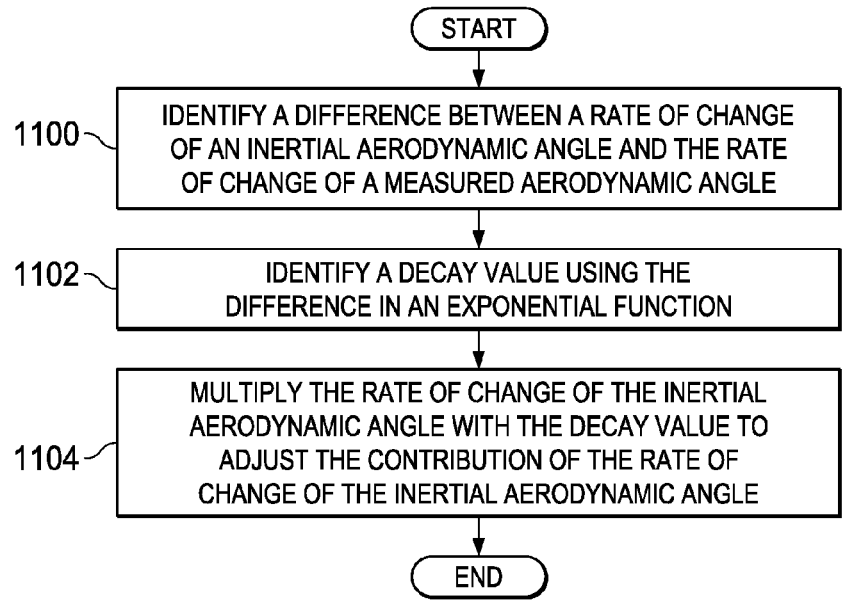
FIG. 11 is an illustration of a flowchart of a process for adjusting a contribution of a rate of change in an inertial aerodynamic angle in accordance with an illustrative embodiment.

With reference next to FIG. 11, an illustration of a flowchart of a process for changing a contribution of a rate of change in an inertial aerodynamic angle is depicted in accordance with an illustrative embodiment. The process illustrated in FIG. 11 is an example of an implementation for operation 1006 in FIG. 10.

The process begins by identifying a difference between a rate of change of an inertial aerodynamic angle and the rate of change of a measured aerodynamic angle (operation 1100). The process identifies a decay value using the difference in an exponential function (operation 1102).

The process multiplies the rate of change of the inertial aerodynamic angle with the decay value to adjust the contribution of the rate of change of the inertial aerodynamic angle (operation 1104). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 12:
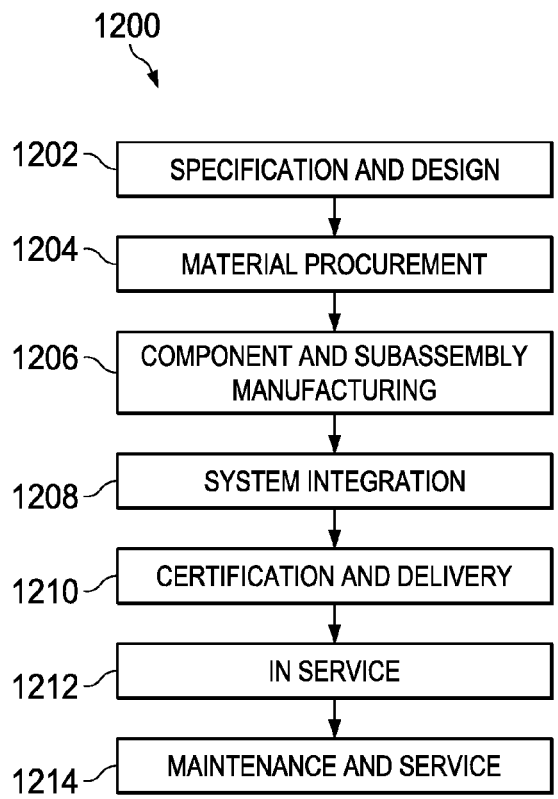
FIG. 12 is an illustration of a block diagram of an aircraft manufacturing and service method in accordance with an illustrative embodiment.
Figure 13:
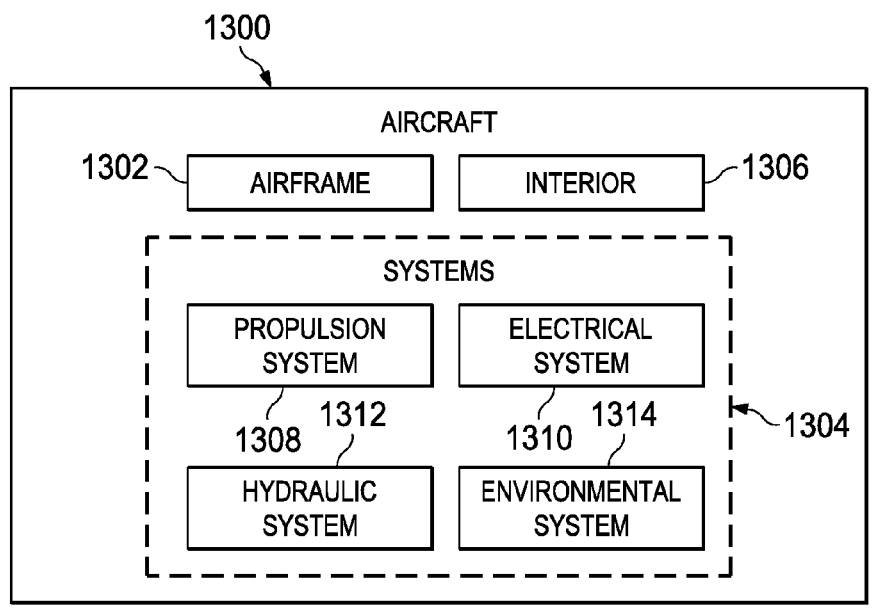
FIG. 13 is an illustration of a block diagram of an aircraft in which an illustrative embodiment may be implemented.

The illustrative embodiments of the disclosure may be described in the context of aircraft manufacturing and service method 1200 as shown in FIG. 12 and aircraft 1300 as shown in FIG. 13. Turning first to FIG. 12, an illustration of a block diagram of an aircraft manufacturing and service method is depicted in accordance with an illustrative embodiment. During pre-production, aircraft manufacturing and service method 1200 may include specification and design 1202 of aircraft 1300 and material procurement 1204.

During production, component and subassembly manufacturing 1206 and system integration 1208 of aircraft 1300 takes place. Component and subassembly manufacturing 1206 and system integration 1208 also may include aerodynamic angle detection system 202 in FIG. 2. Thereafter, aircraft 1300 may go through certification and delivery 1210 in order to be placed in service 1212. In another example, while in service 1212 by a customer, aircraft 1300 is scheduled for routine maintenance and service 1214, which may include modification, reconfiguration, refurbishment, and other maintenance or service.

Each of the processes of aircraft manufacturing and service method 1200 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of a block diagram of an aircraft is depicted in which an illustrative embodiment may be implemented. In this example, aircraft 1300 is produced by aircraft manufacturing and service method 1200 in FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included. Although an aerospace example is shown, different illustrative embodiments may be applied to other industries, such as the automotive industry.

The apparatuses and methods embodied herein may be employed during at least one of the stages of aircraft manufacturing and service method 1200 in FIG. 12. For example, aerodynamic angle detection system 202 in FIG. 2 may be manufactured and installed as part of aircraft 1300 during component and subassembly manufacturing 1206 and system integration 1208 of aircraft.

In another illustrative example, components or subassemblies produced in component and subassembly manufacturing 1206 in FIG. 12 may be fabricated or manufactured in a manner similar to components or subassemblies produced while aircraft 1300 is in service 1212 in FIG. 12. As yet another example, one or more apparatus embodiments, method embodiments, or a combination thereof may be utilized during production stages, such as component and subassembly manufacturing 1206 and system integration 1208 in FIG. 12.

One or more apparatus embodiments, method embodiments, or a combination thereof may be utilized while aircraft 1300 is in service 1212, during maintenance and service 1214 in FIG. 12, or both. For example, modification, reconfiguration, refurbishment, and other maintenance or service in maintenance and service 1214 may include adding aerodynamic angle detection system 202 in FIG. 2 to aircraft 1300. Also, while in service 1212, aerodynamic angle detection system 202 may be used to identify aerodynamic angles for use in operating aircraft 1300.

Thus, one or more technical solutions are present that overcome a technical problem with identifying aerodynamic angles with a reduced amount of noise as quickly and accurately as desired. For example, angles of attack and sideslip angles may be identified in which noise in data from sensor systems is reduced. Further, the detection of these angles may occur more quickly and accurately as compared to currently used filter systems. As a result, one or more technical solutions may provide a technical effect in which noise is reduced and an identification of an aerodynamic angle is detected more quickly and accurately as compared to current filter systems. One or more technical solutions use an inertial aerodynamic angle and an externally measured aerodynamic angle in which contributions of an inertial aerodynamic angle are adjusted. The contribution of a rate of change in the inertial aerodynamic angle is adjusted based on differences between the rate of change of the inertial aerodynamic angle and the rate of change of an externally measured aerodynamic angle.

With the aerodynamic angle detection system in the illustrative examples, noise from transitory turbulence may be reduced along with reflecting sustained gusts of wind with a reduced delay. The result of this processing is a filtered aerodynamic angle that is used to control operation of an aircraft. For example, when the filtered aerodynamic angle is an angle of attack, the filtered aerodynamic angle may be used to generate a stall warning. In other examples, the filtered aerodynamic angle may be used by a data processing system, such as an autopilot or flight control management system in the aircraft, to control flight of the aircraft.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
an aerodynamic angle detection system that calculates a first rate of change in an inertial aerodynamic angle for an aircraft using data received from an inertial measurement system for the aircraft; calculates a second rate of change in an externally measured aerodynamic angle for the aircraft; generates a filtered aerodynamic angle during flight of the aircraft using the first rate of change in the inertial aerodynamic angle and the second rate of change in the externally measured aerodynamic angle; and changes a contribution of the first rate of change in the inertial aerodynamic angle used in generating the filtered aerodynamic angle based on a difference between the first rate of change in the inertial aerodynamic angle and the second rate of change in the externally measured aerodynamic angle, such that the contribution of the first rate of change in the inertial aerodynamic angle increases responsive to a turbulence during the flight of the aircraft and the contribution of the first rate of change in the inertial aerodynamic angle is decreased responsive to a gust of wind, enabling controlling the flight of the aircraft using the filtered aerodynamic angle.

2. The apparatus of claim 1 further comprising:
a controller that controls the flight of the aircraft using the filtered aerodynamic angle.

3. The apparatus of claim 1, wherein the contribution of the first rate of change in the inertial aerodynamic angle is changed to reduce an effect of at least one of a gust of wind or a turbulence.

4. The apparatus of claim 1, wherein in adjusting the contribution of the first rate of change in the inertial aerodynamic angle based on the difference between the first rate of change in the inertial aerodynamic angle and the second rate of change in the externally measured aerodynamic angle, the aerodynamic angle detection system identifies the difference between the first rate of change in the inertial aerodynamic angle and the second rate of change in the externally measured aerodynamic angle; identifies a decay value using the difference in an exponential function; and multiplies the first rate of change in the inertial aerodynamic angle with the decay value to adjust the contribution of the first rate of change in the inertial aerodynamic angle.

5. The apparatus of claim 1, wherein in changing the contribution of the first rate of change in the inertial aerodynamic angle used in generating the filtered aerodynamic angle based on the difference between the first rate of change in the inertial aerodynamic angle and the second rate of change in the externally measured aerodynamic angle, the aerodynamic angle detection system calculates the first rate of change in the inertial aerodynamic angle for the aircraft using the data received from the inertial measurement system for the aircraft and the filtered aerodynamic angle as a feedback to dynamically adjust the first rate of change in the inertial aerodynamic angle.

6. The apparatus of claim 1, wherein in calculating the first rate of change in the inertial aerodynamic angle for the aircraft using the data received from the inertial measurement system for the aircraft, the aerodynamic angle detection system calculates the first rate of change in the inertial aerodynamic angle from at least one of an angular motion, a linear motion from a gravitational force, or the linear motion from aerodynamics and a propulsive force.

7. The apparatus of claim 1, wherein the inertial aerodynamic angle is selected from one of an inertial angle of attack and an inertial sideslip angle, and the externally measured aerodynamic angle is selected from one of an externally measured angle of attack and an externally measured sideslip angle.

8. The apparatus of claim 1, wherein the aircraft is selected from one of an airplane, a commercial airplane, a vertical takeoff and landing aircraft, and an unmanned aerial vehicle.

9. An aerodynamic angle detection system comprising:
a first rate of change identifier that calculates a first rate of change in an inertial aerodynamic angle for an aircraft using data received from an inertial measurement system for the aircraft and a filtered aerodynamic angle;
a second rate of change identifier that calculates a second rate of change in an externally measured aerodynamic angle for the aircraft;
a decay identifier that identifies a decay value based on a difference between the first rate of change in the inertial aerodynamic angle and the second rate of change in the externally measured aerodynamic angle, enabling controlling a flight of the aircraft using the filtered aerodynamic angle;
an adjuster that adjusts a contribution of the first rate of change in the inertial aerodynamic angle to form an adjusted contribution; and
a filter that generates the filtered aerodynamic angle during the flight of the aircraft using the adjusted contribution as adjusted by the adjuster and the externally measured aerodynamic angle, enabling controlling the flight of the aircraft using the filtered aerodynamic angle.

10. The aerodynamic angle detection system of claim 9, wherein the first rate of change identifier calculates the first rate of change in the inertial aerodynamic angle for the aircraft using the data received from the inertial measurement system for the aircraft and the filtered aerodynamic angle, wherein the first rate of change identifier calculates the first rate of change in the inertial aerodynamic angle from at least one of an angular motion, a linear motion from a gravitational force, or the linear motion from aerodynamics and a propulsive force.

11. The aerodynamic angle detection system of claim 9, wherein the filter is a lag filter.

12. A method for processing aerodynamic angles for an aircraft, the method comprising:
calculating a first rate of change in an inertial aerodynamic angle for the aircraft using data received from an inertial measurement system for the aircraft and a filtered aerodynamic angle;
calculating a second rate of change in an externally measured aerodynamic angle for the aircraft;
generating the filtered aerodynamic angle during a flight of the aircraft using the first rate of change in the inertial aerodynamic angle and the second rate of change in the externally measured aerodynamic angle; and
changing a contribution of the first rate of change in the inertial aerodynamic angle used in generating the filtered aerodynamic angle based on a difference between the first rate of change in the inertial aerodynamic angle and the second rate of change in the externally measured aerodynamic angle, such that the contribution of the first rate of change in the inertial aerodynamic angle increases responsive to a turbulence during the flight of the aircraft and the contribution of the first rate of change in the inertial aerodynamic angle is decreased responsive to a gust of wind, enabling controlling the flight of the aircraft using the filtered aerodynamic angle.

13. The method of claim 12 further comprising:
controlling the flight of the aircraft using the filtered aerodynamic angle.

14. The method of claim 12, wherein the contribution of the first rate of change in the inertial aerodynamic angle is changed to reduce an effect of at least one of a gust of wind or a turbulence.

15. The method of claim 12, wherein in adjusting the contribution of the first rate of change in the inertial aerodynamic angle based on the difference between the first rate of change in of the inertial aerodynamic angle and the second rate of change in the externally measured aerodynamic angle comprises:
identifying the difference between the first rate of change in the inertial aerodynamic angle and the second rate of change in the externally measured aerodynamic angle;
identifying a decay value using the difference in an exponential function; and
multiplying the first rate of change in the inertial aerodynamic angle with the decay value to adjust the contribution of the first rate of change in the inertial aerodynamic angle.

16. The method of claim 12, wherein in calculating the first rate of change in the inertial aerodynamic angle for the aircraft using data received from the inertial measurement system for the aircraft and the filtered aerodynamic angle comprises:
calculating the first rate of change in the inertial aerodynamic angle from at least one of an angular motion, a linear motion from a gravitational force, or the linear motion from aerodynamics and a propulsive force.

17. The method of claim 12, wherein the inertial aerodynamic angle is selected from one of an inertial angle of attack and an inertial sideslip angle, and the externally measured aerodynamic angle is selected from one of an externally measured angle of attack and an externally measured sideslip angle.

18. The method of claim 12, wherein the aircraft is selected from one of an airplane, a commercial airplane, a vertical takeoff and landing aircraft, and an unmanned aerial vehicle.

* * * * *